United States Patent [19]

Linnepe et al.

[11] Patent Number: 5,186,429
[45] Date of Patent: Feb. 16, 1993

[54] ELONGATABLE SUPPORT

[76] Inventors: Kurt Linnepe; Marcus Linnepe, both of Burgstr. 6, W-5820 Gevelsberg, Fed. Rep. of Germany

[21] Appl. No.: 872,711
[22] Filed: Apr. 21, 1992
[30] Foreign Application Priority Data Sep. 26, 1991 [DE] Fed. Rep. of Germany ....... 4132070

[51] Int. Cl.⁵ ................................................ A47F 5/00
[52] U.S. Cl. .................................. 248/354.1; 248/412; 254/95; 403/109
[58] Field of Search ................ 248/354.6, 354.7, 354.4, 248/354.1, 352, 408, 409, 412, 411; 403/109, 104; 254/95, 133 A, 104, 108

[56] References Cited

U.S. PATENT DOCUMENTS

| 3,467,352 | 9/1969 | Bohler | 248/412 X |
| 3,583,743 | 6/1971 | Newell | 248/354.4 X |
| 4,083,530 | 4/1978 | Linnepe | |
| 4,234,151 | 11/1980 | John | 248/412 X |
| 4,360,283 | 11/1982 | Psotta | 403/104 |
| 4,375,934 | 3/1983 | Elliott | 254/108 X |
| 4,434,970 | 3/1984 | Boland | 254/108 |
| 4,526,334 | 7/1985 | Rantakart | 248/412 X |

FOREIGN PATENT DOCUMENTS

| 2630446 | 7/1978 | Fed. Rep. of Germany . | |
| 789455 | 1/1958 | United Kingdom | 248/354.4 |

Primary Examiner—J. Franklin Foss
Attorney, Agent, or Firm—Herbert Dubno

[57] ABSTRACT

An elongatable support has a lever actuating a fork for displacing a roller out of wedging engagement between an inclined surface of a head on a tube from which a bar can telescopingly extend, and a surface of this bar. To prevent inadvertent actuation of the lever, an abutment is interposed between the lever and the tube and can be withdrawn manually against gravitational and/or spring force to allow actuation of the lever.

12 Claims, 2 Drawing Sheets

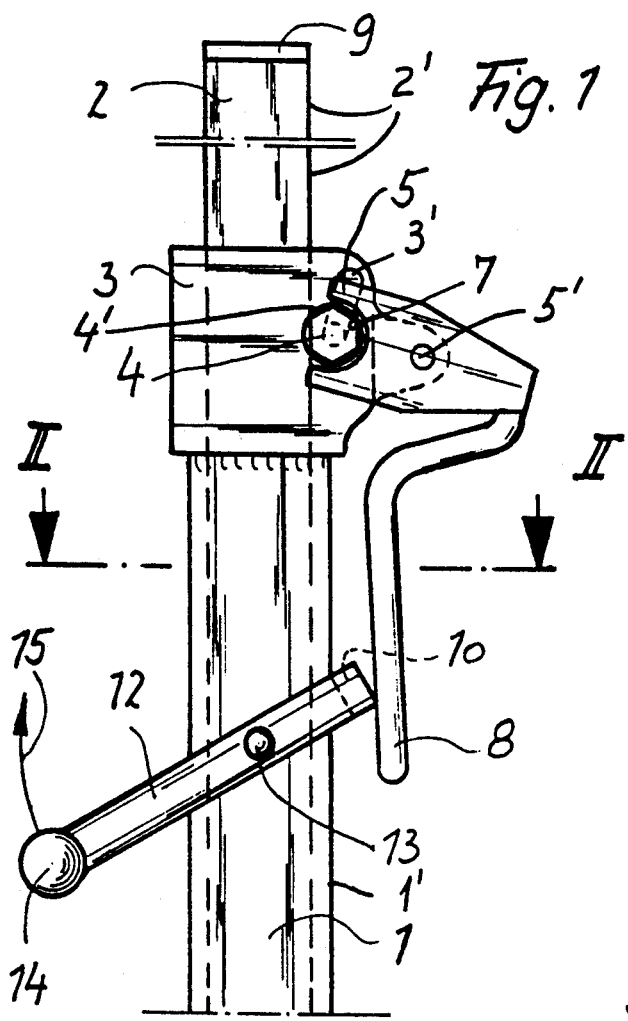
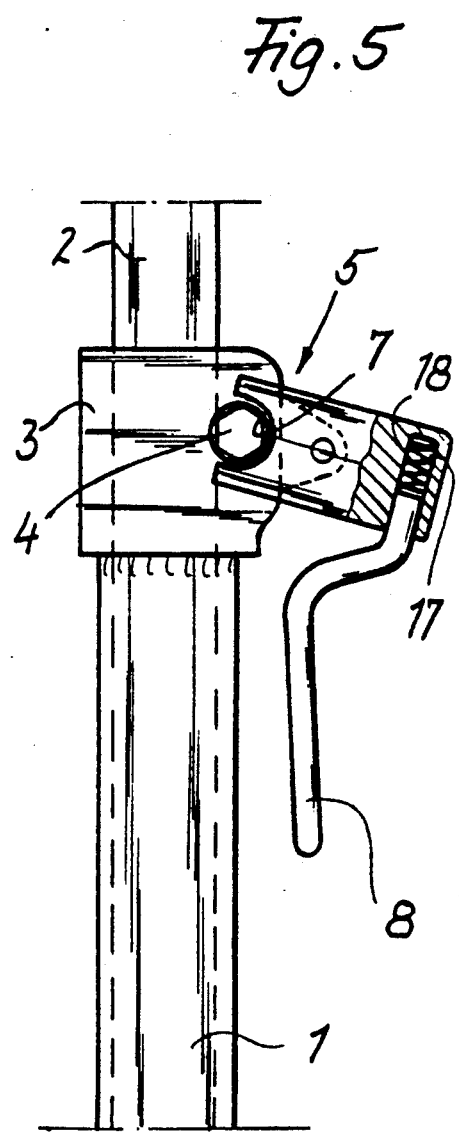
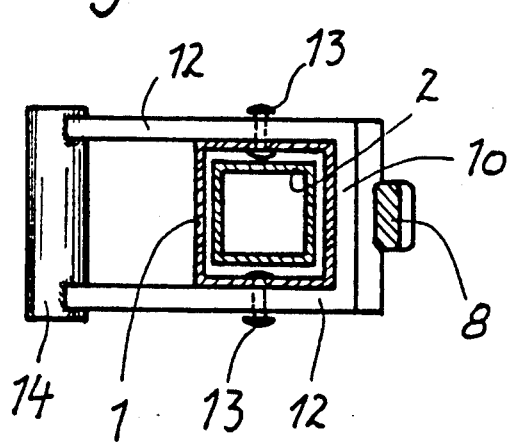

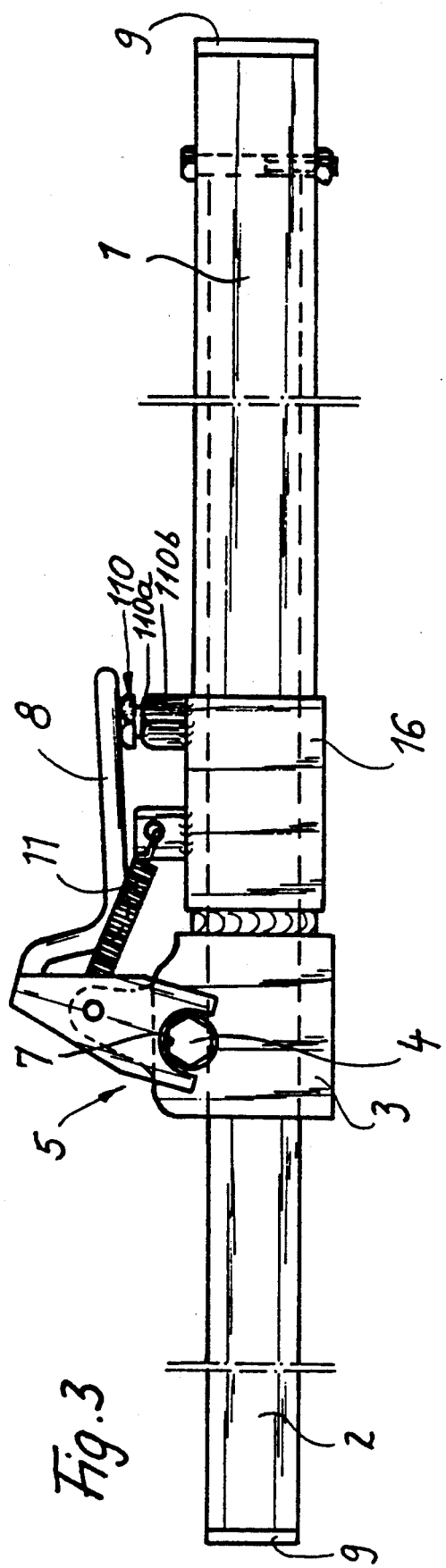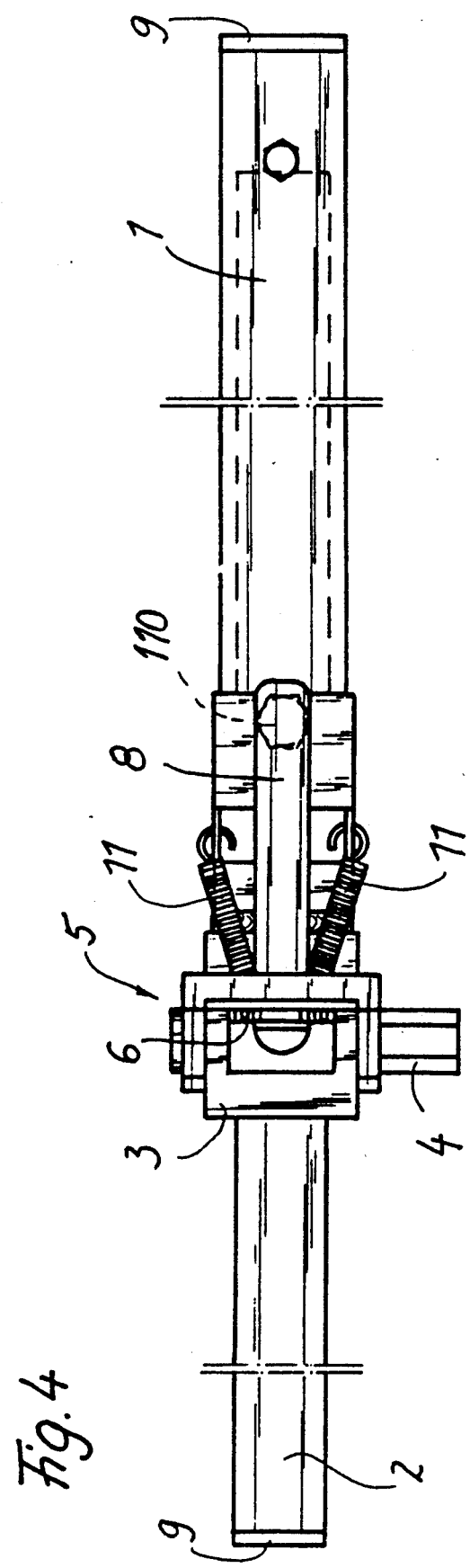

ELONGATABLE SUPPORT

CROSS REFERENCE TO RELATED APPLICATION

This application is related to our copending commonly assigned application Ser. No. 07,892,712 filed concurrently herewith and corresponding to German application P 41 32 035.2 filed Sept. 26, 1991.

FIELD OF THE INVENTION

Our present invention relates to an elongatable support which can be used as a brace between two members, e.g. as a vehicle jack, as a support for opposite walls of a trench or other excavation, as a prop between a supported load and the ground, etc. More particularly, the invention relates to a telescoping support structure in which the actuating lever may by gravity or through some other force, accidentally induce unlocking of the support.

BACKGROUND OF THE INVENTION

In German patent document DE 26 30 446 C2 and U.S. Pat. No. 4,083,530, an elongated support is disclosed in which a pair of telescoping members, namely, a support tube and a hollow bar are actuated by a head formed at the mouth of the tube from which the bar emerges.

That head comprises a drive roller which can be rotated by an external fork, e.g. via a wrench, crank, key or the like, and is wedged between a running surface of the bar and an inclined surface of the head so that, as the roller is rotated, the bar can be extended from the tube.

Under load, however, the roller is jammed between these surfaces in a wedging self-locking action which locks the bar and the tube against contraction.

The roller can be toothed along its surface engageable with the running surface of the bar so that the teeth can bite into this latter surface.

Furthermore, the actuating head can be provided with a guide element which has slots extending generally transversely to the running surface of the bar and the longitudinal dimension of the support and in which the ends of the roller are engaged so that, upon pivoting of this element on the head, the roller can be urged out of its wedged position to release the lock and enable telescoping of the bar relative to the tube.

The guide element can be swingable against the force of a prestressed spring and can have a fork shape. An actuator for the fork, e.g. a handle, can extend substantially parallel to the longitudinal dimension of the support and, under the action of the prestressed spring, can be spaced from the support tube. By manually overcoming the spring force, a user can press the lever or handle closer to the support tube to release the roller.

When, however, the hand of the operator releases the lever or handle, the spring action will restore the handle to its rest position in which the spring presses the roller into its wedging position between the surfaces of the actuating head and the support bar.

Thus, as described in DE 26 30 446 and U.S. Pat. No. 4,083,530, the lever-like handle serves, upon displacement toward the support tube, to bring the drive roller out of engagement with the corresponding running surface of the bar to allow the support to be manually extended or contacted by shoving the bar out of or into the outer tube.

When the elongatable support is to be extended under load, the drive roller can be rotated with a key, wrench or other tools engageable with, for example, a polygonal formation on the drive roller. In this case, the lever-like handle is not actuated and often cannot be since the force applied to the drive roller when the support is under load can exclude the lifting of the drive roller out of its wedged position by a manual swinging of the handle.

However, there are some cases in which the load cannot preclude the swinging of the handle out of position. For example, when the load applied to this support is small, there is a danger that accidental contact with the lever-like handle may unlock the support and prevent the load from being supported, the support then contracting involuntarily. It is also possible, under certain conditions, for gravitational force on the lever-like handle to overcome the prestressed spring action and the effect of a light load and release the support from its locked condition.

OBJECTS OF THE INVENTION

It is, therefore, the principal object of the present invention to provide an elongatable support of the aforedescribed type, especially of the type described in U.S. Patent 4,083,530, whereby accidental release of the drive roller is excluded.

Another object of the invention is to provide an elongatable support which is free from the drawbacks outlined previously.

SUMMARY OF THE INVENTION

These objects and others which will become apparent hereinafter are attained, in accordance with the invention, by providing a device of the support tube of the elongatable support which constitutes a lock abutment which, automatically, i.e. via an automatically effective force, is interposed in the free space between the lever-like handle and the support tube wall and prevents inadvertent movement of the handle toward that wall, but manually is retractable from between the handle and the wall to enable voluntary movement of the handle toward the wall. The automatic force may be a gravitational force in, for example, a vertical orientation of the support or a force provided by at least one spring and biasing the abutment into a blocking position between the handle and the wall of the tube.

More particularly, the elongatable support of the present invention can comprise:

an outer support tube having a mouth at an end thereof;

an inner bar telescopingly receivable in the tube and adapted to be withdrawn from the tube at the mouth for extension of the support and to be inserted into the tube for contraction of the support;

an actuating head on the tube at the mouth and including:

a housing, a drive roller adapted to be wedged between a running surface of the bar and an inclined surface of the housing upon loading of the support, the drive roller having a toothed surface engageable with the running surface of the bar, an actuating element in the form of a fork pivotable on the housing and having shanks formed with guide slots generally transverse to a direction of elongation of the support and receiving ends of the roller for disengaging the roller from the running surface of the bar upon swinging of the fork in one sense,

- a spring biasing the fork in an opposite sense, thereby urging the roller into a wedged position between the running surface and the inclined surface, and
- a leverlike handle connected to the fork and extending generally parallel to the dimension while defining a free space with the tube, whereby actuation of the handle to displace the handle toward a wall of the tube rotates the fork in the one sense; and
- a blocking device including an abutment interposable in the space between the handle and the wall, and means applying a force to the abutment automatically inserting the abutment into the space to block displacement of the handle toward the wall, but enabling manual retraction of the abutment from the space to release the handle.

The abutment can, in its simplest form, be a metallic block which is mounted on a surface of the support tube and is shiftable longitudinally therealong into position under the effect of a spring acting upon this block and preferably prestressed to automatically position the block between the lever or handle and the tube wall. This spring can be a tension spring or a compression spring.

For actuation of the lever-like handle, the abutment must be manually retracted against the spring force from the free space between the lever and the tube wall to enable the lever to be actuated. When the abutment is released, therefore, it is displaced automatically by the spring action again into its blocking position provided, of course, that the lever is also released.

It is also possible to employ gravitational force to displace the abutment into its blocking position. In that case, the support must be so positioned that the free end of the lever is held outwardly by the gravitationally displaceable abutment.

In this position, the abutment can move into the free space between the lever and the wall. By manual operation, the abutment can then be forced out of the free space, e.g. by slight deflection of the lever so that, while the lock is held in its released position by one hand, the lever can be actuated by the other.

According to a feature of the invention, the abutment is formed on a U-shaped swingable stirrup whose shanks straddle the support tube and are pivotally mounted thereon by an axis parallel to the handle and the bias of this stirrup, the handle bridging the shanks. The base is swingable into the free space between the lever and the wall of the tube while the ends of the shanks remote from the base, carrying the stirrup handle, is designed so that the gravitational force thereon automatically swings the stirrup into the blocking position. It thus acts as a counterweight. Of course it is possible to connect a spring to the stirrup to bias the latter into the blocking position.

The result is somewhat similar to that of a rocker or counterpoise on one end of which an abutment is provided and on an opposite end of which a weight or tension or compression spring acts.

When a weight is used to bias the abutment into place, it is merely necessary to provide the abutment so that it is vertically oriented when the free end of the lever or handle is turned outwardly. The weight thus can swing the abutment into the free space between the lever and the tube wall. If a different orientation of the support is desired, it may be advantageous to make the abutment independent of gravitational action, in which case a tension or compression spring can apply the aforementioned force to the stirrup.

According to a preferred embodiment of the invention, a slider is longitudinally shiftable on the tube and carries the abutment. The slider can be held in the blocking position by gravitational force or spring force as well.

The use of the slider allows a mounting and displacement of the abutment on the support tube without an interruption or opening in the wall of the latter. A wall interruption of the support tube may lead to interference with the telescoping action of the bar.

In this embodiment the slider can be shifted solely by gravity into its lever-blocking position or by a spring action. In the blocking position, the abutment is so disposed between the lever and the tube wall that displacement of the lever voluntarily or involuntarily toward the tube wall to release the roller is not possible. The manual shifting of the slider, however, removes the abutment from the free space between the lever and the tube wall so that the lever can be actuated with the other hand of the user. By providing a compression or tension spring to bias the slider into its blocking position, a support may be made independent of orientation.

According to a feature of the invention, the spring action applied to the slider is that of a tension spring prestressed between the slider and the guide element.

It has been found to be advantageous, moreover, to provide the lever or handle to the fork so that it is releasably affixed to this guide element. This feature is, of course, independent of whether or not a blocking member is provided or which blocking member is used. The lever can be inserted into a recess in the guide element, for example, against the force of an ejection spring which can be received in a recess or socket into which the lever is inserted.

Alternatively, the recess or socket can be open in such a direction to enable automatic discharge of the handle or lever by gravity when the lever is released from the hand of the user.

Since the lever-like handle can be simply inserted or removed from the actuating element, operation of the latter only when the lever is intentionally inserted can be ensured. When the handle is removed or released, the ability to accidentally actuate the guide element is eliminated.

BRIEF DESCRIPTION OF THE DRAWING

The above and other objects, features and advantages of the present invention will become more readily apparent from the following description, reference being made to the accompanying drawing in which:

FIG. 1 is a partial side elevational view of a vertically-oriented elongatable support according to the invention;

FIG. 2 is a cross sectional view taken along the line II—II of FIG. 1;

FIG. 3 is a side elevational view of a horizontally-oriented prop embodying the invention;

FIG. 4 is a plan view of this latter prop taken at 90. from the view of FIG. 3; and FIG. 5 is a side elevational view, partly broken away, illustrating another aspect of the invention.

SPECIFIC DESCRIPTION

The elongated support shown in FIGS. 1 and 2 comprises a support tube 1 and a bar 4, preferably a hollow bar, telescopingly received in the tube 1 and extending through an actuating head 3 on the mouth of the tube 1. On the head 3, an externally actuatable roller 4 is mounted, the roller 4 being guided in the housing of the head 3 in a pair of slots 3' as described in U.S. Pat. No. 4,083,530, which are inclined to a running surface 2' of the bar 2 against which the toothed surface of the roller 4 can engage. The roller 4 can have a polygonal portion 4' engageable by a key, wrench or other tool enabling its rotation.

The roller 4, as also described in this patent, has a toothed periphery engageable with the surface 2'. The roller 4, under load, is self-blockingly wedged between the running surface 2' and the inclined surfaces formed by the slots 3' of the head 3. On the head 3, a guide element 5 is pivotally mounted at 5' to swing against the force of a prestressing spring (see the spring 6 in FIG. 4). The element 5 can be a fork formed on opposite sides with guide slots 7 generally transverse to the longitudinal dimension of the support and in which end portions of the drive roller are received. The guide element 5 is provided with a handle 8 and thus has a lever-like action with a fulcrum at the pivot 5' against the effect of the prestressed torsion spring 6 which holds the handle 8 at a distance from the tube 1.

By pressing the handle 8 toward the tube 1, overcoming the spring force of spring 6, the handle 8 approaches the tube 1 and displaces the roller 4 out of its wedging engagement with the bar 2, thereby permitting the bar 2 to be withdrawn from and fed further into the tube 1 to extend or contract the support. The tube 1 and the bar 2 may be rectangular, e.g. square, cross section members closed at their free ends by plugs 9.

In the embodiments of FIGS. 1–4, the support tube 1 carries an abutment 10 or 110 which can be inserted between the handle 8 and the wall 1' of the tube 1. In the embodiment of FIGS. 1 and 2, this abutment is brought into the free space between the handle and the wall 1' by gravitational force while in the embodiment of FIGS. 3 and 4, the abutment is drawn into the free space by the effect of two springs 11 anchored to the guide element 5.

In the embodiment of FIGS. 3 and 4, the abutment 110 comprises a screw 110a in a nut 110b welded to a sleeve 16 so that the screw can be positioned to block displacement of the handle 8 toward the tube 1. In the embodiment of FIGS. 1 and 2, the abutment 10 is a base of a stirrup whose shanks 12 straddle the tube 1. In both cases, the abutment 10 or 110 can be removed from the free space between the handle and the wall 1' by manual actuation against the gravitational action in the case of the embodiment of FIGS. 1 and 2 and against the spring force in the case of the embodiment of FIGS. 3 and 4.

In the embodiment of FIGS. 1 and 2, the shanks 12 of the stirrup are pivotally mounted by rivets 13 forming a pivot axis parallel to the pivot axis of the lever 8, on the support tube 1. At the ends of the shanks 12 remote from the base 10, a counterweight 14 is provided on which, by gravity, tends to swing the stirrup in the clockwise sense.

In the upright arrangement of the support shown in FIG. 1, the stirrup is in its normal position with the abutment 1 blocking displacement of the lever 8 toward the wall 1'.

To release the lever 8 for manual or intentional actuation, the stirrup can be swung in the clockwise sense, i.e. in the direction of arrow 15 so that the abutment 10 deflects the handle 8 slightly outwardly (FIG. 1) until the abutment 10 clears the end of the lever 8, whereupon that lever can be shifted toward the surface 1'.

When the lever 8 is released, the stirrup 12, 10 will spring by the action of gravity back into the position shown in FIG. 1 to lock the handle 8 against further displacement.

In the embodiment of FIGS. 3 and 4, however, the slider 16 is longitudinally shiftable by one hand of the user, e.g. to the right, against the force of the coiled tension springs 11 until the abutment 110 clears the end of the handle 8. For this purpose the slider 16 is formed as a lever surrounding the tube 1.

Once the handle 8 is released, it can be actuated by the other hand of the user to release the roller 4 from engagement with the bar 2. When the handle 8 is released, the slider returns automatically to the position shown in FIGS. 3 and 4 by the action of the spring force to again block actuation of the lever 8.

In the embodiment shown in FIG. 5, the lever 8 is releasably mounted on the guide element 5. For this purpose, the handle need only be inserted into an outwardly open recess or socket 17 in the fork 8.

An ejection spring 18 can be provided in this socket. When the lever 8 is released, the handle is automatically ejected from the fork 5. The handle 8 can be attached by a chain or belt to the support tube 1 so that it will not be lost. The embodiment of FIG. 5 can be used alone or in combination with the embodiments of FIGS. 1 and 2 or 3 and 4.

The actuating head 3, of course, operates in the manner described in U.S. Pat. No. 4,083,530, i.e. the roller 4 is blocked by wedging action under a load to prevent contraction of the support unless the handle 8 is pressed toward the tube 1. However, by rotation of the roller, the support can be extended under load.

The device is not, of course, limited to the specific structure illustrated but encompasses as well all modifications within the spirit and scope of the appended claims and the invention is deemed to include all of the elements of novelty described individually and in combination.

We claim:
1. An elongatable support, comprising:
an outer support tube having a mouth at an end thereof;
an inner bar telescopingly receivable in said tube and adapted to be withdrawn from said tube at said mouth for extension of said support and to be inserted into said tube for contraction of said support;
an actuating head on said tube at said mouth and including:
a housing,
a drive roller adapted to be wedged between a running surface of said bar and an inclined surface of said housing upon loading of said support, said drive roller having a toothed surface engageable with said running surface of said bar,
an actuating element in the form of a fork pivotable on said housing and having shanks formed with guide slots generally transverse to a direction of elongation of said support and receiving ends of said roller for disengaging said roller from said running surface of said bar upon swinging of said fork in one sense, a spring biasing said fork in an opposite sense, thereby urging said roller into a wedged position between said running surface and said inclined surface, and a leverlike handle connected to said fork and extending generally parallel to said dimension while defining a free space with said tube, whereby actuation of said handle to displace said handle toward a wall of said tube rotates said fork in said one sense; and a blocking device including an abutment interposable in said space between said handle and said wall, and means applying a force to said abutment automatically inserting said abutment into said space to block displacement of said handle toward said wall, but enabling manual retraction of said abutment from said space to release said handle.

2. The elongatable support defined in claim 1 whereby said blocking device comprises a generally U-shaped stirrup pivotally mounted on said tube about an axis parallel to an axis of said fork and having a base forming said abutment and a weight automatically positioning said abutment in said space by gravitational action.

3. The elongatable support defined in claim 1 wherein said force is a spring force applied to said blocking device.

4. The elongatable support defined in claim 2 wherein said weight is a bar interconnecting ends of shanks of said stirrup straddling said tube.

5. The elongatable support defined in claim 1 wherein said blocking device includes a slider shiftable along said tube and carrying said abutment.

6. The elongatable support defined in claim 5 wherein said force is a spring force of a spring biasing said slider.

7. The elongatable support defined in claim 6 wherein said slider is a sleeve.

8. The elongatable support defined in claim 7 wherein said spring is a tension spring.

9. The elongatable support defined in claim 1 wherein said force is gravitational force.

10. The elongatable support defined in claim 1 wherein said handle is releasably connected to said fork.

11. The elongatable support defined in claim 10 wherein said fork is provided with a recess, said handle being fitted into said recess and said recess contains an ejection spring for automatically ejecting said handle from said recess upon release of said handle by a user.

12. An elongatable support, comprising:

an outer support tube having a mouth at an end thereof;

an inner bar telescopingly receivable in said tube and adapted to be withdrawn from said tube at said mouth for extension of said support and to be inserted into said tube for contraction of said support; and an actuating head on said tube at said mouth and including:

a housing, a drive roller adapted to be wedged between a running surface of said bar and an inclined surface of said housing upon loading of said support, said drive roller having a toothed surface engageable with said running surface of said bar, an actuating element in the form of a fork pivotable on said housing and having shanks formed with guide slots generally transverse to a direction of elongation of said support and receiving ends of said roller for disengaging said roller from said running surface of said bar upon swinging of said fork in one sense, a spring biasing said fork in an opposite sense, thereby urging said roller into a wedged position between said running surface and said inclined surface, and a leverlike handle releasably connected to said fork and extending generally parallel to said dimension while defining a free space with said tube, whereby actuation of said handle to displace said handle toward a wall of said tube rotates said fork in said one sense, said fork having a recess, said handle being receivable in said recess, an ejection spring being provided in said recess for automatically ejecting said handle upon the release thereof by a user.

* * * * *